United States Patent [19]

Mason

[11] 4,029,034

[45] June 14, 1977

[54] METHOD AND APPARATUS FOR BUOYANCY CONTROL OF SUBMERGIBLE CHAMBERS

[76] Inventor: Burton Hoster Mason, P.O. Box 504, Covington, La. 70433

[22] Filed: Feb. 25, 1976

[21] Appl. No.: 661,148

[52] U.S. Cl. .............................. 114/16 E; 61/69 R
[51] Int. Cl.² ........................................ B63G 8/22
[58] Field of Search .............. 114/.5 T, 16 R, 16 E, 114/16 F, 52, 53, 121, 125; 61/69 R, 69 A

[56] References Cited

UNITED STATES PATENTS

| | | | |
|---|---|---|---|
| 3,512,493 | 5/1970 | Hallanger | 114/53 |
| 3,732,837 | 5/1973 | Hogan | 114/52 |
| 3,765,354 | 10/1973 | Gronroos | 114/16 R |
| 3,782,317 | 1/1974 | Kriedt et al. | 114/52 |
| 3,800,722 | 4/1974 | Lepage | 114/16 E |
| 3,851,491 | 12/1974 | Mason | 61/69 R |
| 3,860,983 | 1/1975 | Furth et al. | 114/16 R |

*Primary Examiner*—Trygve M. Blix
*Assistant Examiner*—Stuart M. Goldstein
*Attorney, Agent, or Firm*—Marvin Feldman; Stephen E. Feldman

[57] ABSTRACT

An apparatus having a bouyancy control tank mounted in conjunction with a submergible chamber, and being provided with a source of gas under pressure to the tank and wherein several vertically disposed pipes are arranged and constructed within the tank so that each pipe may be selectively opened from within the manned chamber for fluid communication from the tank to the ambient water below the tank. Pressurized gas to the tank forces water therein through a selected open pipe to the ambient water, so that a gas-water interface in said tank is attained at about the top free end of the opened pipe. To discharge gas under pressure from the tank, valves are mounted on the tank and which may be actuated from within the manned chamber or remotely, and with the discharge of the gas, water from outside the tank passes through the selected open pipe into the tank. The chamber is designed to provide a life-supporting environment so that bouyancy control operations may be conducted from within the chamber. This bouyancy control apparatus is particularly useful in limited diameter chambers and diving bells to attain positive bouyancy from any altitude for emergency ascent.

12 Claims, 8 Drawing Figures

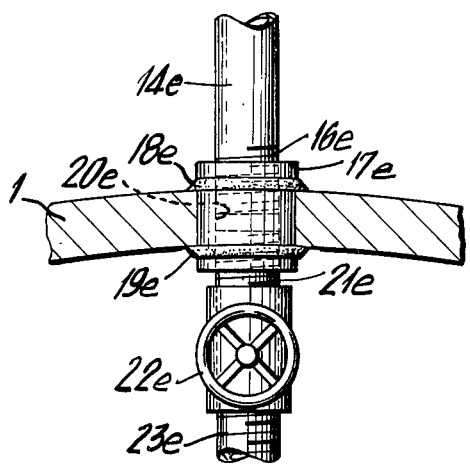
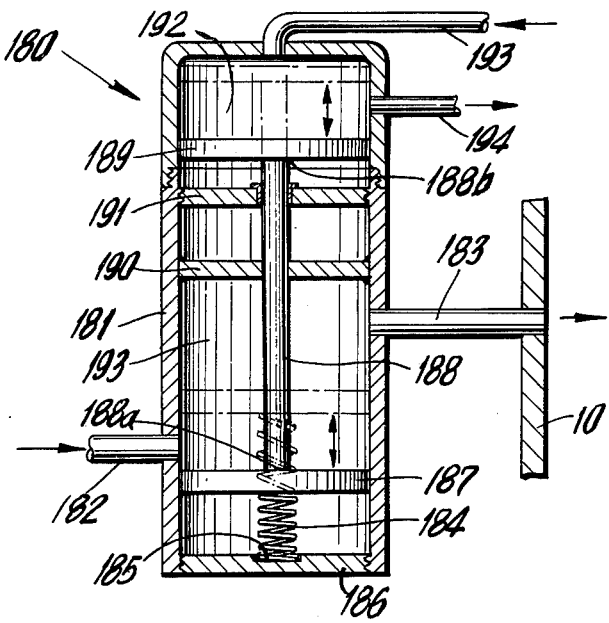
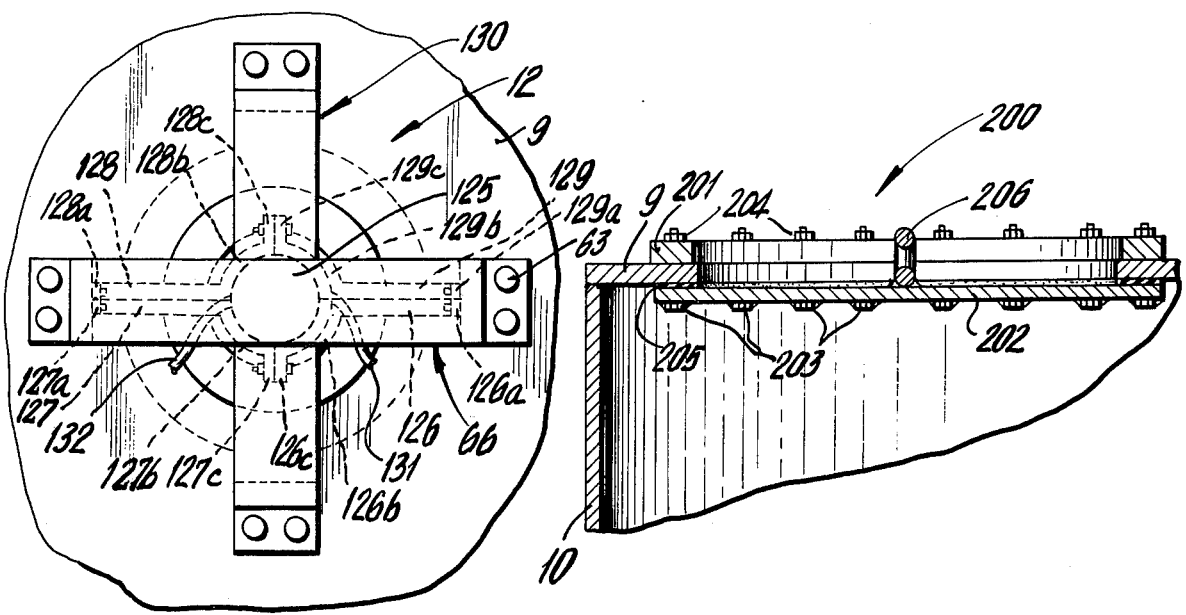
FIG.5
FIG.8
FIG.6
FIG.7

METHOD AND APPARATUS FOR BUOYANCY CONTROL OF SUBMERGIBLE CHAMBERS

This invention relates to an apparatus for bouyancy control. Specifically this invention relates to an apparatus for controlling the bouyancy of a submergible chamber for underwater operations.

Heretofore bouyancy control systems for submerged operations were either of the type generally limited to shallow depth operations, such as in diving cages, or in greater depths, were complex electro-hydraulic or electromechanical stabilization control systems such as those employed in submarines or exploratory craft.

Heretofore certain tethered manned submergible chambers were provided with a bouyancy tank which was designed to facilitate ascent or descent only without suitably controlling the chamber at a specific desired position at a substantial depth.

Now there is provided by the disclosure herein a readily assembled and operated bouyancy control apparatus for a submergible chamber which is designed to be manually operated from within the chamber or remotely operated from a surface station at a desired range of depths of from several hundred to several thousand feet; the chamber being releasably held at a desired depth. The apparatus of this present invention may be of a principally mechanical design and operation to minimize the cost of operation and maintenance. The present bouyancy control system provides for flexibility in operating depths, in that readily interchangeable parts are assembled at the surface thereby permitting variations in design; each design having been precalculated for a specific subsea operation.

The bouyancy control apparatus of this present application may be specifically utilized with the submergible chamber system of U.S. Pat. No. 3,851,491, issued Dec. 3, 1974.

It is therefore an object of this invention to provide an apparatus and method for controlling the bouyancy of a submergible chamber in subsea operations.

It is another object of this invention to provide an apparatus as aforesaid in which several bouyancy control designs are readily interchangeably assembled with a submerged chamber for several subsea operations.

It is still a further object of this invention to provide an apparatus and method to provide positive bouyancy for safe ascent of a submerged chamber having a tether disengaged therefrom.

It is a further object of this invention to provide a bouyancy control system wherein there is a conservation of pressurized gas to the ballast tank.

It is further an object of this invention to provide an apparatus and method for providing positive bouyancy to a submergible chamber secured to guide wires so as to more positively maintain the chamber at a desired depth.

It is a further object of this invention to provide a bouyancy control system wherein the bouyancy control valving is designed to be positively and safely manually operated from within the chamber.

It is a further object of this invention to provide a bouyancy control system for a submergible chamber which is operable in various chamber attitudes.

It is still a further object of this invention to provide a bouyancy control apparatus as aforesaid which is readily and economically constructed and assembled and yet which is safe and practical for use at subsea locations.

It is still a further object of this invention to provide a bouyancy control apparatus as aforesaid which is suitable in raising, lowering and positioning any submergible apparatus such as undersea oil production assemblies, blow-out preventer stacks, equipment and the like.

The aforesaid as well as other objects and advantages which will become subsequently apparent in a reading of the construction and operation as more fully hereinafter described and claimed, reference being had to the accompanying drawings forming a part hereof, and in which:

FIG. 5 is an enlarged sectional view of fluid conduit pipe and valve;

FIG. 6 is a bottom view of the gas discharge valve taken along line 6—6 of FIG. 3;

FIG. 7 is an enlarged partial sectional view of the hatchway on top of the ballast tank; and FIG. 8 is an enlarged sectional view of an auxiliary gas discharge valve.

Figure 1:
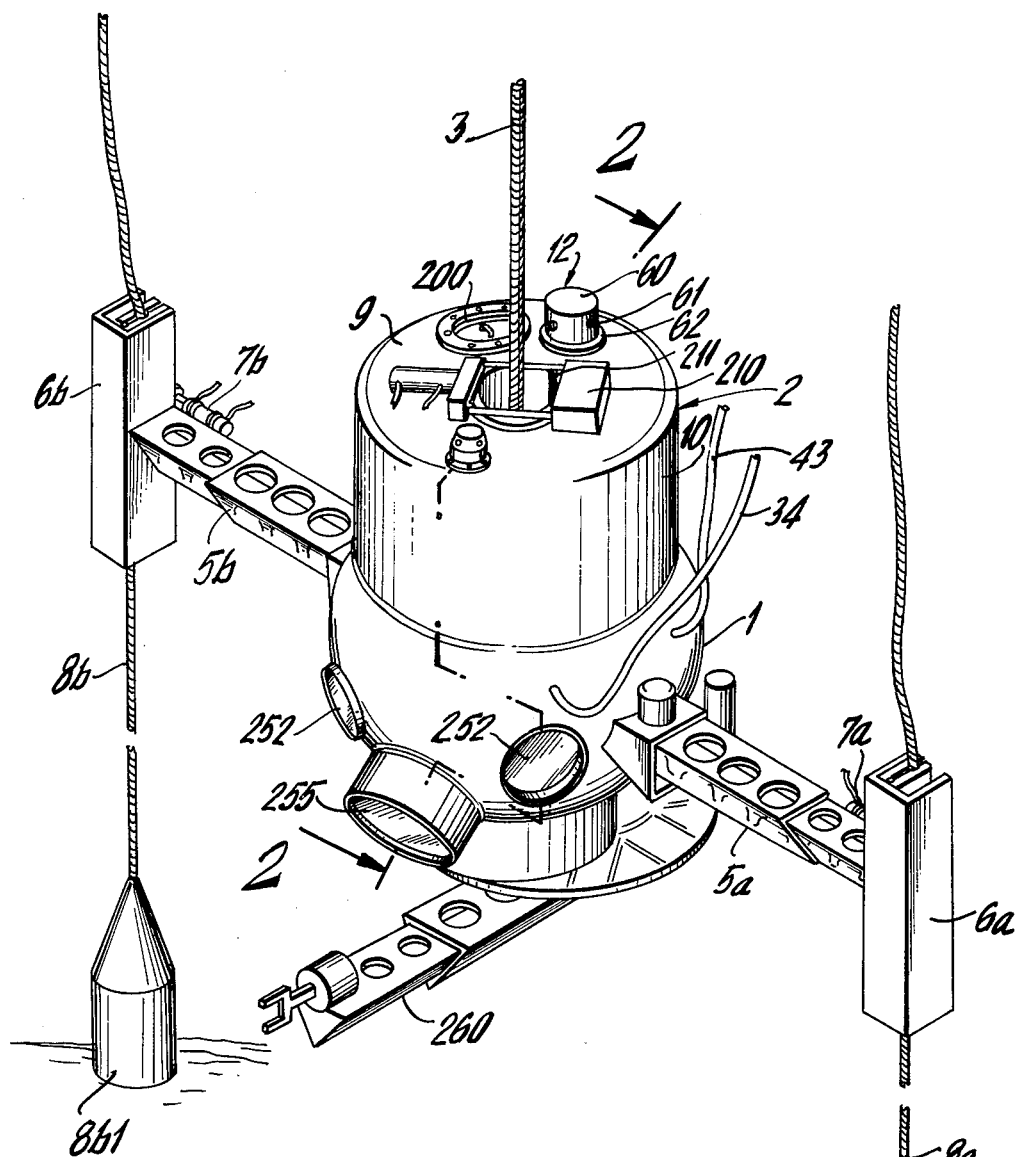
FIG. 1 is a perspective view of a submergible chamber with the buoyancy tank mounted therewith; the chamber being maintained at a depth.
Figure 2:
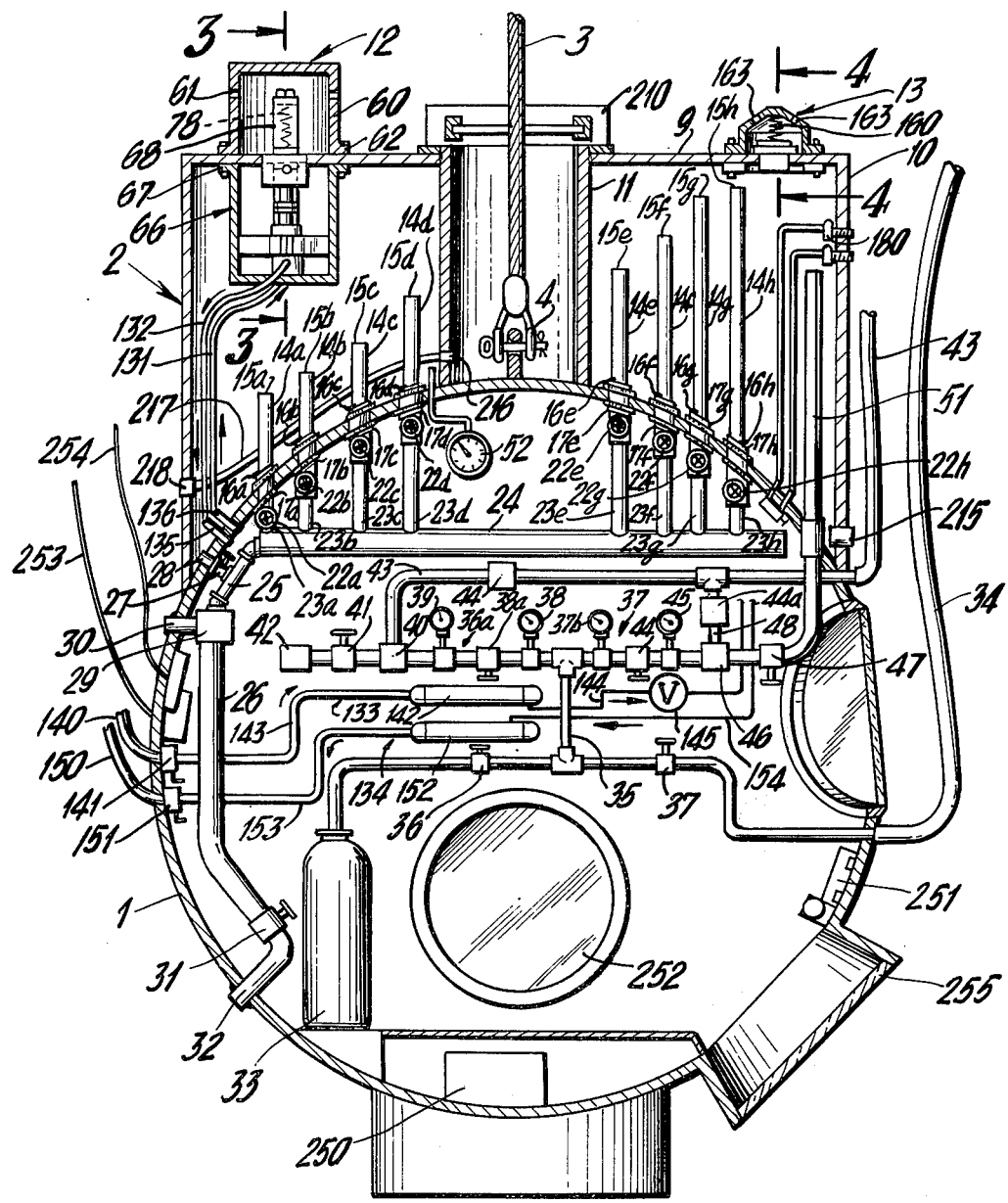
FIG. 2 is a sectional view of the chamber and tank of FIG. 1 taken along line 2-2 of FIG. 1.

Referring to FIGS. 1 and 2 there is shown a submerged, chamber 1 of spherical configuration having a torodial-shaped ballast tank 2 centrally mounted on the top of said chamber. The chamber is tethered to a surface station by means of tether cable 3 which is secured to the chamber 1 by means of shackle 4. Tether cable 3 passes coaxially through the central vertical axes of tank 2 and chamber 1.

Chamber 1 is formed with two outwardly extending, retractably extensible, guide gripping arms 5a and 5b, respectively. At the outwardly extending end of the guide gripping arms 5a and 5b are formed hydraulically actuated clamps 6a and 6b, respectively. Clamps 6a and 6b are pivotally opened and closed by means of hydraulic cylinders 7a and 7b, respectively. In the open position clamps 6a, 6b slidably engage vertically disposed guide wires 8a and 8b, respectively. In the closed position clamps 6a, 6b gripping, frictionally engage said guide wires 8a, 8b so as to hold the chamber 1 at a specific desired depth. The guide wires are fixed at a surface station (not shown) and held or weighted to the sea floor, by weights 8a1 and 8b1.

The bouyancy control system permits accurate depth location of the chamber as the clamps 6a and 6b slidably engage the guide wires. When the guide wire clamps 6a, 6b are in the closed gripped position, the bouyancy control system assures accurate depth stabilizations as will be further discussed hereinafter.

The bouyancy control system comprises ballast tank 2 of annular configuration designed to maintain gas-water interface therein. The level of the gas-water interface will of course be proportional to the bouyancy of the tank at a given depth.

The tank 2 comprises a top annular wall 9, an outer cylindrical wall 10 integrally formed with top wall 9 and spherical chamber 1 and inner cylindrical wall 11 integrally formed with the top wall 9 and spherical chamber 1. Tank 2 is so formed with chamber 1 as to form gas-tight tank.

A hydraulically actuated, spring-loaded, primary discharge valve 12 and spring loaded emergency gas vent valve 13 are mounted to top wall 9 of tank 2 for purposes as will be further described hereinafter.

Referring now to FIG. 2, there are shown eight vertically disposed pipes 14a, 14b, 14c, 14d, 14e, 14f, 14g and 14h inclusive; each pipe being of a different height in tank 2. Each pipe has a top open end 15a–h, respectively and a bottom end portion 16a–h which is externally threaded for screw engagement with collars 17a–h, respectively. Collars 17a–h, are fitted through the chamber wall 1 and annular welds such as at 18e and 19e (FIG. 5) are made at the upper and lower mating edges of each collar with the chamber wall. Collars 17a–h may be rated to withstand pressures of 3000 psi. Collars 17a–h are formed with internal threads such as 20e (FIG. 5) for rotatably receiving and screwing the threaded bottom end 16a–h of the pipes 14a–h, at the upper ends of the collars. Internal threads of collars 17a–h also serve to rotatably receive the external threaded portion 21a–h of a pipe section extending from valve 22a–h. Valves 22a–h serve essentially as gate valves so that one of said pipes may be open for fluid communication from the tank to the ambient water environment below said tank as will be more fully discussed hereinafter. Stop valves may be provided at all through-hull fittings.

Extending downwardly from valves 22a–h are pipe sections 23a–h which are integrally formed with a common header 24. Header 24 is horizontally disposed in chamber 1 and has a downwardly formed angular pipe section 25 mated to the header and a vertically depending section 26. Mounted to the angled pipe section 25 is a valve 27 and pipe section 28 extending upwardly therefrom. Pipe section 28 extends through chamber wall 1 into tank 2 so that valve 27 selectively permits fluid communication to tank 2. A first main fluid communication valve 29 is mounted to the upper end of pipe portion 26 below angled pipe section 25 and has an outwardly extending pipe section 30 passing through chamber wall 1. Said first valve 29 is a three way valve. A second main fluid communication valve 31 is mounted to the lower end of section 26 and is formed with pipe section 32 extending downwardly and outwardly therefrom. Pipe section 32 passes through chamber wall 1 for fluid communication with the ambient water environment in a similar manner to pipe section 30. Pipe sections 30 and 32 are welded and sealed to chamber wall 1 so as to provide a water tight fitting with the interior space of chamber 1.

By this manner of construction ambient water at a pressure greater than the pressure in tank 2 may be permitted to flow through pipe sections 32 or 30 and into tank 2 through any one selected open valve of the aforesaid valves 22a–h and 27.

Valve 31 is vertically disposed below valve 29 and communicates with a lower sea depth and therefore communicates with ambient water at the orifice of pipe 32 at a greater pressure than that at the orifice of the higher pipe section 30. The ambient water pressure will be of course determine the driving force of the water to the tank. The desired water feed pressure is thusly selected.

Two alternative pressurized oxygen-containing gas supply means are provided to provide a gas under pressure to the tank 2 for bouyancy control and to the chamber 1 interior for a life supporting environment. The first gas supply means is a series of compressed gas tanks 33 (typical). The second gas supply means is a pump station operatively mounted to surface station (not shown) and a feed line 34 connects the pump station with the gas piping manifold arrangement in chamber 1.

Tank feed 33 and station feed line 34 are mated to common header 35. Supply valves 36 and 37 operatively connect tank feed 33 and station feed 34, respectively, to the common header 35. On the downstream side of header 35 is a tee-branch. Portion 36a of the tee-branch supplies the environmental gas to the chamber while the second portion 37a supplies the pressurized gas to tank 2 for bouyancy control.

The gas may be an oxygen-containing gas such as a breathable oxygen-helium mixture or may in fact be compressed air. Inert gas may be employed with separate oxygen tanks for the manned operation.

Manifold gas supply section 36a comprises from upstream-to-downstream, pressure gauge 38, valve 38a, pressure gauge 39, relief valve 40, valve 41 and filter 42. Relief valve 40 is connected to vent line 43 which in turn passes through chamber 1 and is connected to the surface station. A check valve 44 is mounted in vent line 43 to prevent back flow to section 36a. By this manner of construction an oxygen-containing gas is supplied to the interior of chamber so as to provide a life-supporting environment. Pressure control and regulation is maintained by means of the valves and gauges in section 36. The pressure in the chamber may be atmospheric or greater if so desired. Inadvertent over-pressurization is avoided by pre-setting the relief valve 40 to the maximum desired pressure and any over pressure is vented to the surface station.

Manifold pressurized gas supply section 37 is interconnected to tank 2, and comprises from upstream-to-downstream, pressure gauge 37b, valve 44a, pressure gauge 45, relief valve 46 and valve 47. Relief valve 46 is connected to vent line 48 which in turn is connected to vent line 43. A safety check valve 44 is connected in line 48 to prevent back flow from vent line 43 to manifold section 37a. Section 37a is screw-fitted to collar 50, said collar 50 being fitted and welded to the chamber wall. A vertically disposed feed pipe 51 is screw fitted to the top of collar 50. By this manner of construction, pressurized gas by one or both of the aforesaid supply means is manifolded and regulated through section 37a and through pipe 51 into tank 2.

The aforesaid tank pressurized gas supply system and the aforesaid fluid communication system operate in combination. For example with tank filled with water (i.e. minimum positive bouyancy), one of said valves 22a–h may be opened and one of said main valves 29 and 31 may be opened. With the valves open, the water in the tank is in communication with the ambient water below the tank. Gas under a pressure greater than the tank pressure may then be supplied by one or both of the aforesaid supply means to the tank. The gas having of course a specific gravity significantly less than the water displaces the water through the opened fluid communication to the outside water environment. Such tank water displacement continues until the top end 15a–h of the selected open vertically disposed pipe 14a–h is reached. At that point continued gas flow will cause said gas to enter the opened fluid communication lines. The remaining tank water being below the top opened end 15a–h of the one selected opened pipe, will not be discharged through the opened fluid communication lines.

The prevailing tank pressure is measured and indicated on gauge 52, the indicator of which is housed in the chamber.

In the event the tank water level is desired to be lowered, that is, to further increase the positive bouyancy, the aforesaid selected opened valve 22a-h is closed and another of said valves 22a-h of a pipe 14a-h which is of less height than the previously selected pipe is then opened. The pressurized gas will then displace additional tank water until the new lower level is of the tank is attained, thereby further increasing the positive bouyancy.

Figure 3:
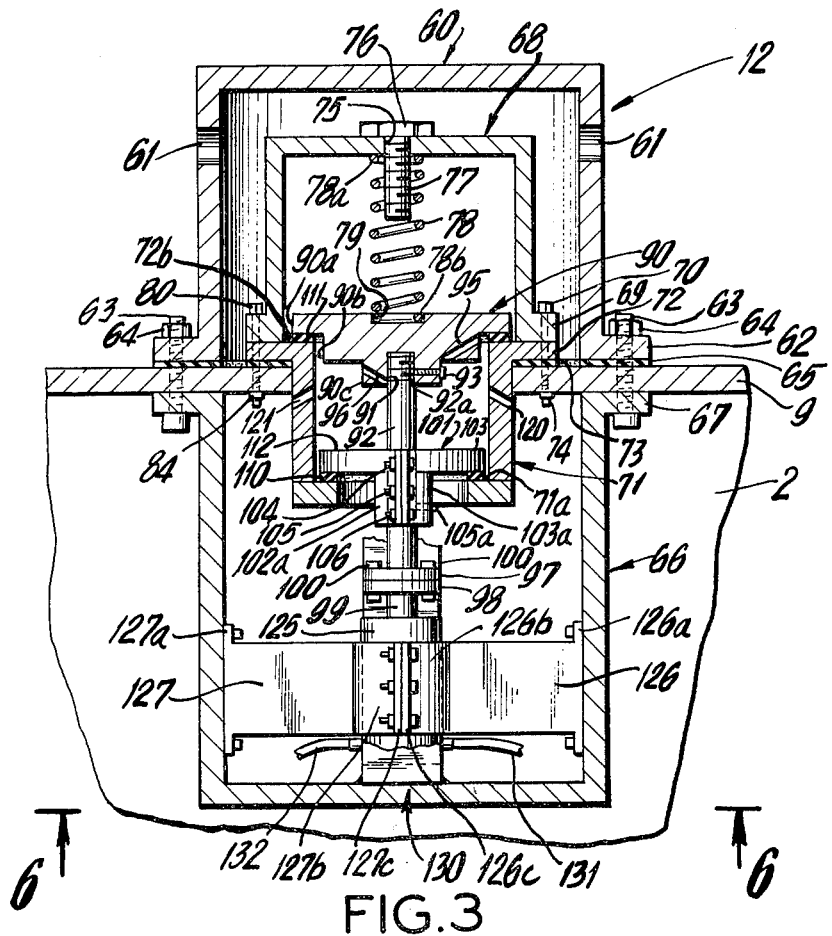
FIG. 3 is an enlarged sectional view of the gas discharge valve taken along line 3—3 of FIG. 2.

Referring now to FIGS. 2, 3 and 6, the primary gas discharge valve 12 is mounted to top wall 9 of tank 2. Valve 12 may be actuated open, with the gas supply closed, so as to discharge gas from the tank to the environment above the tank. Thusly there is the concommitant introduction of water upwardly from the ambient water environment below the tank through the selectively opened fluid communication lines to the tank. All the gas in the tank may thereby be displaced so as to provide maximum negative bouyancy.

Valve 12 comprises an inverted cylindrical cup-shaped cover plate 60 being formed with a plurality of gas discharge openings 61 (typical) on the cylindrical walls thereof. A flange 62 is formed with the lower end of the cylindrical walls and flange 62 is bolted to top wall 9 by circumfrentially disposed bolts 63 (typical) and nuts 64 (typical) passing therethrough. An annular gasket 65 fitted between the bottom face of flange 62 and the top face of wall 9, gasket 65 is of course formed with holes to accomodate bolts 63 (typical). Bolts 63 further mate flange 67 of U-shaped bottom valve support plate 66 with the bottom face of tank wall 9. Mounting plate 66 is therefore disposed within the tank 2.

A U-shaped support member 68 is radially inwardly displaced from cover plate 60. Support member 68 is formed with an outwardly disposed lower flange 69 which is formed with holes for receiving bolts 70. Flange 69 is bolt-mounted to flange 72 of valve seat 71 which, said flange 72 in turn being mated to annular gasket 73 which is interfitted to the top face of wall 9. Bolts 70 and 80 thereby extend downwardly through flange 69, flange 72, gasket 83 and wall 9 and is securely held by means of nuts 74 and 84.

A centrally disposed threaded bore 75 is formed in the top of member 68. A screw bolt 76 with having an extended shank portion 77 is received in bore 75. A compression spring 78, the upper end thereof 78a, is centrally mounted onto shank 77, and the lower end 78b is slidably received in central recess 79 of primary valve seat 90. Valve seat 90 is centrally, radially inwardly disposed from member 68 and comprises a first annular portion and radially inwardly disposed therefrom, and a third annular portion 90c formed with the second annular portion and radially inwardly disposed therefrom. Central recess 79 is formed in the top face of portion 90a for receiving spring 78. An upwardly centrally disposed screw threaded bore 91 is formed in lower portion 90c. The upwardly disposed screw threaded end 92a of valve shaft 92 is rotatably received in bore 91. Shaft or stem 92 is fixedly held in bore 91 by means of set screw 93 transversely disposed thereto and rotatably horizontally received in portion 90c of valve seat 90. Further through openings 95 and 96 are formed in portions 90b and 90c of valve seat 90 to provide auxiliary gas discharge passageways.

Valve stem or shaft 92 depends vertically, centrally downwardly and is formed with a lower flange portion 97 which is bolt-mounted to a mating flange 98 of retractably extensible ram 99 by means of circumfrentially disposed bolts 100 (typical).

A secondary valve seat 101 is mounted on stem 92 below the primary valve seat 90. Seat 101 is radially inwardly disposed from the inner face of U-shaped support member 71. Valve seat 101 comprises a pair of symmetrical, annular, mating flange portions 102 and 103. Annular flanges 102 and 103 are bolt mounted to each other and to stem 92 by means of six bolts 104, 105, 106, only shown in FIG. 3. A set screw 105a assures non-slidable engagement of seat 101 with stem 92.

Support member 71 is formed with a lower central bore which is of greater diameter than the annular-shaped, flangemated sections 102a and 103a of seat 101, but of less diameter than the upper flange portions 102 and 103 of seat 101. A compressible rubber annular seat member 110 is bonded to the top inner face 71a of member 71. Seat member 110 is compressed by the downward force of seat 101, in turn connected to stem 92, upon retraction of stem 92 by hydraulic ram 99.

Similarly a second compressible, rubber annular seat member 111 is bonded to the upwardly disposed top face 72b of flange 72 member 71. Seat member 111 is compressed by the downward force of primary seat 90, in turn connected to stem 92 as aforesaid. By this manner of construction both valve seats 90 and 101, simultaneously compressively engage respective seat members 111 and 110 in downwardly moving stem 92 upon retraction of ram 99.

Conversely, extension of ram 99 causes vertically upward movement of stem 92 thereby disengaging seats 90 and 101 from gaskets 111 and 110 respectively forming annular openings. Such disengagement permits gas in the tank to pass through the formed annular openings and outward of the tank through holes 61 (typical), auxilliary gas escape passageways 95 and 96 are formed in primary valve seat 90 and auxilliary gas passageways 120 and 121 are formed in support member 71 to further assist in the discharge of tank gas through the primary valve seat 90.

Referring again specifically to FIGS. 3 and 6, there is shown retractably extensible ram 99 slidably housed in hydraulic cylinder 125. Cylinder 125 is centrally mounted with U-shaped support member 66 by means of four brackets 126, 127, 128 and 129. Each of said brackets is formed with an outer flange member 126a, 127a, 128a and 129a respectively which flange members are bolt-mounted to support member 66. At the inward end of each of the aforesaid brackets is an annular portion 126b, 127b, 128b and 129b terminating in outwardly disposed flange portions 126c, 127c 128c and 129c, respectively. Flange 126c is bolt-mounted with flange 127c, and flange 128c is likewise bolt-mounted to flange 129c. A second U-shaped support member 130 is transversely disposed to first U-shaped support member and is similarly bolt-mounted to the top wall 9 (see FIG. 6). The bottom end of hydraulic cylinder 125 is received in the crossed lower portions of support members 130 and 66.

Hydraulic fluid transmission conduit lines 131 and 132 are connected to cylinder 125 and extend outwardly and downwardly therefrom. Hydraulic lines 131 and 132 pass downwardly through tank 2 and are connected through chamber wall 1 at fittings 135, and 136, respectively, to hydraulic fluid supply means 133 and hydraulic fluid return means 134, respectively (actual connections not shown).

Hydraulic fluid supply means 133 comprises a main supply line 140 interconnected from surface station (not shown) through chamber wall 1 to a main feed valve 141. Valve 141 is interconnected to surge tank 142 by transmission line 143. A second transmission line (shown in schematic) 144 is connected to surge tank 142 on the downstream side thereof.

A control valve 145 (typical) then supplies the hydraulic fluid through lines 131 to valve 12 to actuate said valve to open. Upon permitting return of the hydraulic fluid from valve 12 through line 132 to hydraulic return means 134, the spring 78 actuate valve 12 to close same by the valve seating as heretofore described. The spring 78 force of about 10 to 15 psi is usually sufficient to maintain seated primary and secondary valve seats to prevent gas leakage. Further the force of spring 78 may be readily overcome by the upward force of hydraulic ram 99, stem 92 and in turn primary valve seat 90.

Hydraulic fluid return means 134 comprises a main return line 150 interconnected from a surface station (not shown) to chamber wall 1, a main return valve 151, interconnected to transmission line 153, in turn interconnected on the downstream side of return surge tank 152, and a return upstream line 154 (the latter line 154 shown schematically). In this manner hydraulic fluid is supplied to and from the chamber for operating hydraulic cylinders for performing several functions including that of actuating the man gas discharge valve 12. The hydraulic fluid is of the oxygen compatible, non-flammable type.

Figure 4:
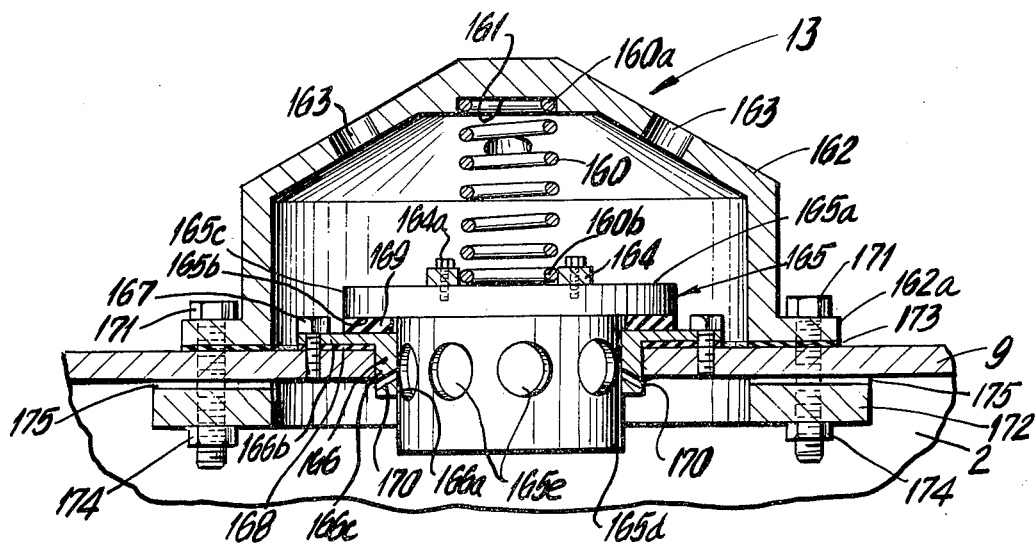
FIG. 4 is an enlarged sectional view of the vent valve taken along line 4—4 of FIG. 2.

Referring now to FIGS. 2 and 4 there is shown emergency vent valve 13 mounted to top wall 9 of tank 2 for gas discharge therefrom. Valve 13 comprises a compression spring 160 which is compressible at from about 2 to about 4 pounds force. One end 160a of spring 160 is housed within central recess 161 of housing 162. Housing 162 if formed with peripheral openings 163 (typical) to permit gas discharge therethrough. Housing 162 is formed with a lower outwardly extending flange 162a which is bolt-mount to tank wall 9 by means of a plurality of circumfrentially spaced bolts 171 (typical). Wall 9 is bored to receive bolts 171. A gasket 173 is fitted between flange 162a and wall 9. At the inward side of tank wall 9 bolts 171 (typical) slidably engage annular mounting plate 172. A plurality of nuts 174 (typical) engage bolts 171 (typical) to gas-tightly secure housing 162 to the tank wall 9. Mounting plate 172 is formed with a plurality of horizontally disposed gas passageways 175 (typical) as will be further discussed hereinafter.

The lower end 160b of spring 160 is coaxially aligned with and fitted within annular plate 164. Annular plate 164 is in turn mounted to the top face 165a. Valve seat member 165 comprises an upper annular flange member 165c being formed with a circular top face 165a and an annular lower face 165b, and a depending lower cylindrical flange 165d is formed with and coaxially aligned with top flange 165c. Lower cylindrical flange 165d is formed with a plurality of circular openings or air passageways 165e (typical). The outer surface of cylindrical flange 165d slidably engages the inner cylindrical surface of 166a of annular seat member 166.

Seat member 166 is an annular flange having an angle section configuration having a horizontally disposed flange 166b and an angled depending flange 166c. Flange 166b is mounted to top wall 9 by bolts 167 (typical). An annular 168 gasket is fitted between the bottom of angle flange 166b and the top wall 9. The depending flange 166c is formed with a plurality of air passageways 170 (typical). An annular compressible gasket 169 is bonded to the top of angle section 166b. The downward force of spring 160 causes the lower face 165b of valve seat member 165 to compress gasket 169 so as to provide a seal between valve seat member 165 and seat member 166. In this position, that is the normal position, the gas in the tank 2 cannot escape through emerging vent valve 13.

In the event the force differential across valve 13, that is the force differential from the inside of tank 2 to the water environment above said tank, exceeds about four pounds in magnitude, spring 160 will compress lifting valve seat member 165 away from seat member 166. Gas under pressure then passes through the botton of flange 165d and outwardly through openings 165e as openings 165e register with the opened space between valve seat member 165 and seat member 166. Gas passageways 175 and 170 ensure a rapid surge of air to the valve seat 165 to provide positive, quick-acting valve action.

In certain cases it may be desirable to provide a specific accurate gas-water level in tank 2. To this end auxiliary valves, that is a plurality of hydraulically actuated valves 180 (typical) are mounted within tank 2 and communicate with the ambient water environment outside tank 2. (See FIGS. 2 and 8). Valve 180 comprises a housing 181 being formed with a gas inlet conduit 182 outlet conduit 183 connected thereto and communicating therewith. Conduit 183 passes through side wall 10 of tank 2 so as to be in communication with the outside ambient environment. A compression spring 184 is centrally mounted within recess 185 of the bottom wall 186 of housing 181. The upper end of spring 184 contactingly engages the bottom face of piston 187. Piston 187 slidably engages the inner side walls of cylindrical housing 181. Piston rod 188 is centrally integrally connected with piston 187 at one end 188a of said rod. The other end 188b of the rod 188 is integrally connected to a second piston 189. Piston rod 188 slidably engages annular guide plate 190 and an upper annular plate 191. Plate 191 is provided with seals to seal upper chamber portion 192 from lower chamber portion 193. Upper chamber portion 192 communicates with hydraulic transmission conduit feed 193 and hydraulic transmission conduit return 194.

In FIG. 8 the solid lines depict the valve when hydraulically actuated and the broken lines depict valve 180 in a rest condition. In such rest condition it is seen that gas inlet 182 does not communicate with lower chamber 193 and gas outlet 183. To actuate valve 180 so as to permit tank-to-water environment communication, hydraulic fluid enters chamber 192 through conduit 193 causing piston 189, rod 188 and piston 187 to move downwardly compressing spring 184. Piston 187 thereby moves past the orifice of inlet 182 permitting fluid communication from inside tank 2, through inlet 182, lower chamber 193, outlet 183 and finally outside tank 2.

Valve 180 is one of a series of such valves utilized to "trim" or "fine tune" the bouyancy by letting out air after "blowing down" the tank (i.e. removing water to the desired pre-set level) so as to achieve and maintain a specific reduction in bouyancy.

Certain other auxiliary features are provided with tank 2 further described hereinafter.

Referring now to FIGS. 1 and 7 there is shown a man-way or hatchway 200 of oval configuration. Hatchway 200 comprises a top oval annular mounting ring 201, an oval cover 202 disposed on the inner side of top wall 9 of the tank. Cover 202 is bolt mounted to wall 9 and ring 201 by means of inverted circumfrentially disposed bolts 203 (typical) and nuts 204 (typical). The nuts 204 may readily be engaged by a wrench to remove the nut. Bolts 203 may be welded to cover 202. An oval annular gasket 205 is pressingly engaged between the top of cover 202 and the bottom of wall 9. A handle 206 is axially, centrally disposed on cover 202 and integrally formed therewith by means of welds. The hatchway 200 provides access to the interior of tank 2 for repair, maintenance or for changing the sizes of pipes 14a–h.

Another important auxiliary feature of tank 2 is that top wall 9 is sloped downwardly from main discharge inlet 12 so as to permit complete discharge of gas from the tank and further preclude air pockets from forming at other points in tank 2.

Other auxiliary features of tank 2 include a cable cutter 210 mounted to top wall 9 of tank 2. Cutter 210 encompasses tether cable 3 and blade 211 is transversely disposed to cable 3 so as to be able to sever the cable, if cable 3 is entangled.

Referring now to FIG. 2 there is shown a tank drain plug threaded into cylindrical wall 10 of tank, for removing residue water from tank in maintenance and repair. Further insofar as inner cylindrical tank wall 11 forms a basin with chamber wall 1, an inner drain plug 216, drain line 217, and outer drain plug permit fluid communication from said basin to a point therebelow. Upon removal of the chamber from the sea, water in said basin passes by gravity through line 217 and out plug 218.

As previously stated chamber 1 is designed to provide a breathable life-supporting environment therewithin. Breathable gas may be supplied by tank 33 or from the surface station by means of line 34. An operator within chamber will exhale carbon dioxide and water vapor which substances must be removed. Therefore a condensation type dehumidifier 250 and a carbon dioxide absorption unit 251 are provided. Further several port holes or view ports 252 are formed in chamber wall 1 to permit the operator to view subsea operations. Entrance and egress of the operator to chamber 1 is accomplished by means of hatchway 255. Communications and electrical power for the operator in the chamber is provided by means of a two-way communications relay line 253 and an electric power cable 254, respectively.

Further subsea operations are preformed from within the chamber by remote actuation of the work arm unit 260 (see FIG. 1).

In operation, one or more operators enter the chamber 1 through hatchway 255 and the hatchway is secured. All life supporting control systems, communication systems, electrical (lighting) and hydraulic power systems are checked. Main fluid inlet valve 31 is opened, main fluid inlet valve 29 is closed, feed valve 27 is opened and pipe valves 22a–h are closed. Main gas discharge valve 12 is hydraulically actuated from within the chamber to open said valve.

The chamber 1 is lowered into the sea from the surface station by means of tether cable 3. Guide gripping clamps 6a and 6b are opened so as to slidably engage guide wires 8a and 8b, respectively. As chamber 1 is lowered, water enters pipe 32 passes upwardly through pipe 26 and pipe 28 and enters tank 2. Air is simultaneously discharged from the tank through valve 12. The tank is completely filled with sea water for maximum negative bouyancy, and at about 20 feet sea depth the tank is checked to assure that it is completely filled. The chamber may be lowered without guides as well.

The tank is then descended on tether cable 3 to approximately the desired depth. During such descent valve 31 is closed and valve 29 is opened and remains open.

In the event positive bouyancy is required gas supply valve 36 or 37 will be open and valves 44 and 47 are opened to permit gas under pressure to enter tank 2 through pipe 51. Extremely high pressure gas is to be avoided as the thin light-weight walls 9, 10 and 11 of the tank are normally designed for about a 10–20 psi pressure differential. Emerging vent valve 13 and gas relief valve 46 are pre-set to assure that this limitation will not be exceeded. Pressure gauge 52 will at all times measure the tank pressure.

As the gas under pressure enters the tank the water will be discharged through a selected opened pipe 14a–h.

In the further event the operator wishes to reduce the bouyancy, main gas discharge valve 12 is reopened to discharge the tank gas and water reenters the tank through the opened fluid communication pipe 14a–h. A gas-water level at the top of the one selected, opened fluid communication pipe is attained. Further with all pipes 14a–h closed, one (or possible more) of the turn valves is opened at the desired level to constantly maintain the desired bouyancy.

At the desired depth the chamber through the guide gripping arms may be grippingly secured to the guide wires for further depth stability, and tether cable 3 may be slackened.

When the operator is ready to surface, valves 31, 29 and 28 are opened as well as possibly one or several of pipe valves 14a–h. Gas is introduced into the tank through pipe 51. The bouyancy is increased and the chamber rises and the tank gas expands. By the time the chamber is at the surface the tank is free of water except for residual amounts which are removed through drain 215. Further the chamber may be set at any desired negative bouyancy, and taken to the surface by lift wire 3.

Further the bouyancy control system as aforesaid is designed to return the chamber to an upright position should that occasion arise. This uprighting procedure is as follows.

Valve 12 is closed. Valve 31 is closed and valve 29 (now in a lowered position) is opened. Gas enters the tank through line 51 and water leaves the tank through the opened pipe 14f, 14g or 14h. Valve 22f, 22g or 22h is closed and valves 22g to 22a are then opened and closed accordingly as required to level and hold the chamber in the upright position.

As previously stated the guide gripping arms may be actuated from within the chamber to grip the respective guide wires. Thereafter positive bouyancy may be provided to the tank to cause tautness in the guide wires portions below the guide gripping arms (FIG. 1). And the upper guide wire portions as well as the tether cable may be slackened from the surface station. By this method the chamber is releasably secured at a desired depth and the aforesaid slackened wires and tether cable minimize movements to the chamber that may be caused at surface and upper sea and thereby effect the guide wires and tether cable movement.

The term "fluid conduit means" as used hereinbefore and in the claims includes a series of vertically disposed valves in the tank as well as a plurality of valved pipes as previously described. The operation of the valves in each case selectively adjusts the desired operable height of the fluid conduit means.

It is within the contemplation of this invention to provide several such bouyancy control systems for undersea positioning of a chamber. Such multiple control systems may be separately operated so as to control the pitch, yaw and roll as well as the depth of the chamber.

It is also within the contemplation of this invention to provide the bouyancy control system in combination with submergible apparati other than a chamber, as by way of example blow-out preventer stacks, hydraulic rams, oil production assemblies, pumps, pipeline repair systems, stingers and floats for lowering pipelines to the sea bed, and the like.

While there is described and illustrated a specific embodiment of the invention, it will be clear that variations in detail of the specific embodiment specifically illustrated and described may be resorted to without departing from the spirit and scope of the invention as defined in the appended claims.

What is claimed is:

1. In combination with a submergible apparatus comprising a chamber, an apparatus for controlling the bouyancy of the first said apparatus, comprising a tank mounted on the chamber, fluid conduit means comprising a plurality of pipes extending vertically upward into said tank for communicating from the interior of said tank to the outside ambient environment below said tank, each of said pipe means having valve means operatively mounted therewith, and means within said chamber to selectively actuate each of said valve means, gas conduit means connected to said tank for providing a gas thereto, and discharge valve means mounted on said tank to discharge a gas therefrom to the outside ambient environment above said tank, whereby gas is supplied through the gas condit means and displaces water in the tank through the fluid conduit means until the level of the water in the tank reaches about the top of the fluid height in one of the pipes.

2. The apparatus of claim 1, further comprising presurized gas supply means integrally connected to said gas conduit means and means to controllably operate the supply of gas under pressure to said tank from within said chamber.

3. The apparatus of claim 1, further comprising means to disconnect at least one of said pipe means to connect a second pipe means in place of the disconnected pipe.

4. The combination of claim 2, wherein said gas comprises oxygen, second gas conduit means communicating with said gas supply means and with said chamber for providing gas thereto, pressure regulation means mounted on said second gas conduit means to regulate the pressure of the gas to the chamber.

5. The combination of claim 1, wherein said apparatus is a chamber and said tank is toroidal-shaped and is fixedly mounted to the top of said chamber.

6. The combination of claim 5, wherein said chamber is spherical and wherein the vertical diameter of said chamber is coaxial with the vertical axis of said tank.

7. The combination of claim 5, wherein said chamber is tethered and wherein the tether is coaxial with the vertical axis of said chamber and with the vertical axis of said tank.

8. The combination of claim 1, further comprising means to actuate said discharge valve means, said actuating means being mounted within said chamber and actuation transmission conduit means interconnected from said actuating means to said discharge valve means.

9. The combination of claim 1, further comprises a plurality of trim valves vertically disposed on said tank and communicating between the inside of said tank and the environment outside said tank, and means to selectively actuate each of said valves.

10. In combination with a submergible chamber, an apparatus for controlling the bouyancy of said chamber, comprising a tank mounted on said chamber, fluid conduit means comprising a first portion passing upwardly into said tank and a second portion integrally connected with said portion passing through said chamber to the outside of said chamber below said tank, and means to disconnect said first portion from said second portion, valve means connected to the fluid connect means for selective fluid communication, gas conduit means connected to said tank for providing a gas thereto, and discharge valve means mounted on said tank to discharge a gas therefrom to the outside ambient environment above said tank, whereby gas is supplied through the gas conduit means and displaces water in the tank through the fluid conduit means until the level of the water in the tank reaches about the top of the fluid conduit means.

11. The apparatus of claim 10, further comprising valve means mounted to said second portion within said chamber for selective communication of said fluid conduit means with the outside ambient environment of the chamber below the tank.

12. The apparatus of claim 10, wherein said second portion of said fluid conduit means comprises a first orifice disposed at the outside of said chamber and a second orifice disposed at the outside of said chamber, said second orifice being disposed below said first orifice, and means to selectively permit fluid communication of said second portion with one or the other of said orifices.

* * * * *